C. WEILAND.
AUTOMOBILE BUMPER.
APPLICATION FILED FEB. 14, 1914.
1,098,860.
Patented June 2, 1914.
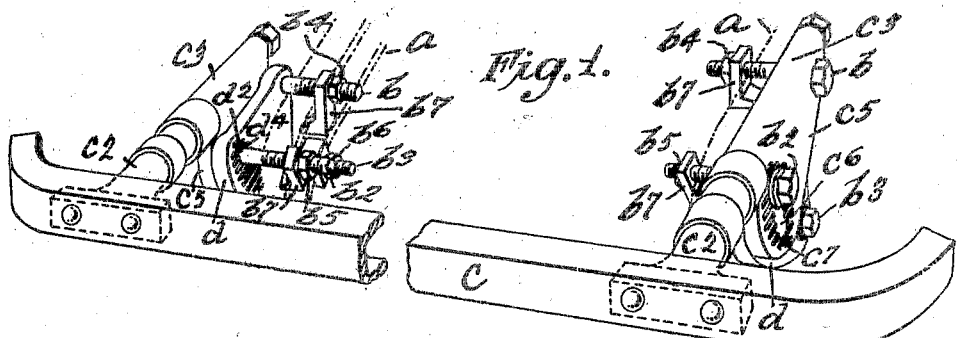
Fig. 1.
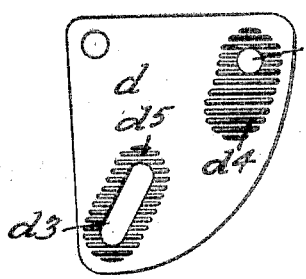
Fig. 2.
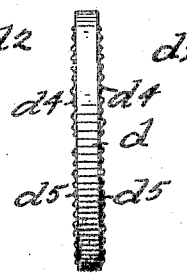
Fig. 3.
Fig. 4.
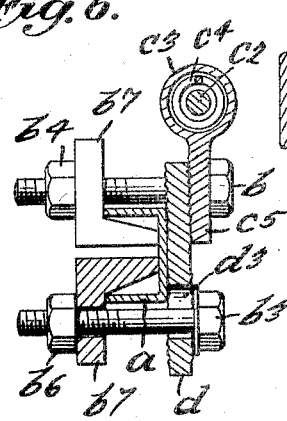
Fig. 6.
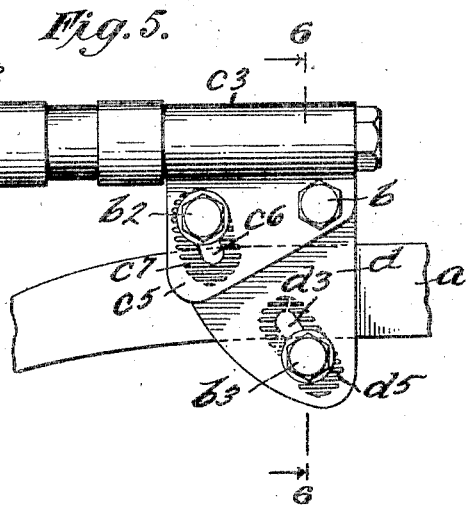
Fig. 5.
Attest:
by
Inventor:
Charles Weiland
J. Chris Lassen Atty.

UNITED STATES PATENT OFFICE.

CHARLES WEILAND, OF NEW YORK, N. Y.

AUTOMOBILE-BUMPER.

1,098,860.	Specification of Letters Patent.	Patented June 2, 1914.

Application filed February 14, 1914. Serial No. 818,618.

*To all whom it may concern:*

Be it known that I, CHARLES WEILAND, a citizen of the United States of America, and residing at New York, in the county of New York and State of New York, have invented certain new and useful Improvements in Automobile-Bumpers, of which the following is a specification, such as will enable those skilled in the art to which it appertains to make and use the same.

This invention relates to bumpers for automobiles by means of which impact of the automobile against a fixed object shall be taken in a resilient or cushioned manner, and one of the objects of this invention is to provide means for adjusting the said bumpers to the frames of all makes of automobiles of standardized dimensions.

Another object is to provide an intermediate adjusting element between the automobile frame and a fixed part of the bumper and which permits adjustment with respect to either the automobile frame or the bumper or both.

Another object is to so form the said intermediate element as to be adaptable to either end of the bumper, at either side of the automobile, thus rendering the same universal and preventing any mistake on the part of careless or unskilled persons in the installation of the bumper on the automobile.

Another object is to provide both pivot and locking bolts to anchor the bumper in desired position on the automobile, which bolts may be of conventional form.

Another object is to provide clamps on the said bolts adapted for engagement with a desired part of the automobile frame and on either side of the automobile, thus making the pivot and locking means universal and permitting the use of ordinary stock bolts and nuts, and, with these and other objects in mind, my invention consists in the details of construction hereinafter described and claimed.

My invention is fully set forth in the following specification, of which the accompanying drawings form a part, in which the separate parts are designated by the same reference characters in each of the views, and in which:—

Figure 1 is a perspective view of my bumper in operative position on an automobile frame, the latter being indicated by broken lines for clearness of showing; Fig. 2 is a face view of one side of the intermediate adjusting element which I employ; Fig. 3 is an edge view thereof; Fig. 4 is a face view of the opposite side thereof to show the similarity to the side shown in Fig. 2; Fig. 5 is a fragmentary side elevation of the bumper on the frame; and Fig. 6 is a section taken on the line 6—6 of Fig. 5.

In the drawings forming a part of this application I have shown, fragmentarily, the frame $a$ of an automobile, usually of channel formation as clearly shown in Fig. 6, and it is to this frame that my bumper is attached by means of bolts $b$, $b^2$, and $b^3$, provided with nuts $b^4$, $b^5$, and $b^6$, respectively, a frame clamping hook $b^7$ being loosely mounted on each of said bolts and adapted to be engaged within the channel of the frame members, and it will be noted that the bolts, nuts, and clamping hooks may be used on either side of the automobile and are also interchangeable, and it will also be noted that the bolts and nuts are of conventional or stock type whereby they may be readily replaced in the event of the loss of one or more thereof without appreciable expense.

The bumper consists of a transverse guard $c$, curved rearwardly at the ends thereof, and carried by plunger rods $c^2$ movable in cylinders $c^3$ having resisting means therein, such as springs as shown in Fig. 6 at $c^4$, said cylinders having, each, a depending leaf member $c^5$ having a pivot hole for the bolt $b$ and a segmentally formed slot $c^6$ for the bolt $b^2$, and I prefer to score or otherwise roughen the surfaces, inner and outer, of the said leaf member around the slot $c^6$, as shown at $c^7$, for a reason later pointed out. Also pivoted on the bolt $b$, between the leaf member $c^5$ and the frame $a$, on each side of the automobile, is an adjusting element $d$, hereinafter called the adjustable pivot plate, said plates having, each, a hole $d^2$ for the bolt $b^2$ and an inclined slot $d^3$ for the bolt $b^3$, both sides of the said plates being identical and the surfaces thereof, adjacent to the hole $d^2$ and the slot $d^3$ being scored or otherwise roughened, as shown at $d^4$ and $d^5$, respectively.

The bolt $b$ acts as the pivot for both the leaf member $c^5$ and the pivot plate $d$, on the corresponding side of the automobile, and when the nut $b^4$ thereon is set up the bumper is pivotally clamped on the frame, the bolt $b^2$ being then secured in position after adjusting the leaf members $c^5$ with respect to the pivot plates whereby the plunger rods and the cylinders therefor are substantially horizontal, it being understood that the bolts $b$ and $b^2$ rest upon the upper sides of the frame members, or practically so, the bolts $b^3$, when secured in position, serving to prevent upward movement of either the bumper or pivot plates on the pivot bolt $b$, and the bolts $b^2$ preventing downward movement, the slot $b^3$ permitting adjustment of the pivot plates to different vertical widths of frame members $a$, and it will thus be seen that my bumper is firmly, though adjustably, locked in desired position and may be installed by any unskilled person without regard to whether the pivot plates $d$ are right or left or vice versa, and without regard to the position of any one of the bolts, nuts, or clamping hooks.

The scorings or otherwise roughened surfaces of the depending leaf members $c^5$ and of the pivot plates serve to prevent movement of contiguous parts upon each other when the bumper is in operative position, although permitting adjustment of the parts when desired after loosening the bolts and nuts, and I do not limit myself to any specific form of uneven surface for this purpose, neither do I limit myself to the exact shape of the leaf members nor of the intermediate pivot plates other than to make the latter identical on opposite surfaces whereby they are interchangeable at will and thus universal, neither do I limit myself to the exact form of clamping hooks except as to the interchangeability thereof and of the bolts and nuts.

Having fully described my invention, what I claim as new, and desire to secure by Letters Patent, is:—

1. In combination with the frame of an automobile, a bumper, comprising a transverse guard, two plunger rods therefor, a cylinder for each rod provided, each, with a dependent leaf member having a hole and a segmental slot therein, a pivot plate interposed between each leaf member and said frame and provided with two holes and an inclined slot, a pivot bolt passed through the hole of each leaf member and one of the holes of each pivot plate, a bolt passed through the slot of each leaf member and through the other hole of each pivot plate, a bolt passed through the slot of each pivot plate, a nut for each bolt, and a clamping hook loosely mounted on each bolt and adapted to engage said frame, said bolts, nuts, and clamping hooks serving to clamp said leaf members, pivot plates and frame together, adjustably.

2. In combination with the frame of an automobile, a bumper, comprising a transverse guard, two plunger rods therefor, a cylinder for each rod provided, each, with a dependent leaf member having a pivot hole and a segmental slot therein, a pivot plate interposed between each leaf member and said frame, and provided with a pivot hole, a supplemental hole and an inclined slot, a bolt passed through said pivot holes, a bolt passed through said supplemental pivot plate hole and through said leaf member slot, on each side of said frame, a bolt passed through the slot of each pivot plate, a nut for each bolt, a clamping hook on each bolt, engaged with said frame, said leaf members being adjustable on said pivot plates and said pivot plates being adjustable on said frame, and said pivot plates being identical with each other and each side thereof being identical whereby they may be interchangeably used on either side of said frame.

In testimony that I claim the foregoing as my invention I have signed my name in presence of the subscribing witnesses this 11 day of February 1914.

CHARLES WEILAND.

Witnesses:
JOHN B. ANDERSON,
J. C. LARSEN.